United States Patent
Goldman-Shenhar (10) Patent No.: US 10,252,729 B1
(45) Date of Patent: Apr. 9, 2019

(54) DRIVER ALERT SYSTEMS AND METHODS

(71) Applicant: GM GLOBAL TECHNOLOGY OPERATIONS LLC, Detroit, MI (US)

(72) Inventor: Claudia V. Goldman-Shenhar, Mevasseret Zion (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/837,081

(22) Filed: Dec. 11, 2017

(51) Int. Cl.
*B60Q 1/00* (2006.01)
*B60W 50/14* (2012.01)
*B60W 40/09* (2012.01)

(52) U.S. Cl.
CPC ............ *B60W 50/14* (2013.01); *B60W 40/09* (2013.01); *B60W 2050/143* (2013.01); *B60W 2050/146* (2013.01); *B60W 2520/105* (2013.01); *B60W 2520/125* (2013.01); *B60W 2540/30* (2013.01)

(58) Field of Classification Search
CPC ............... B60W 50/14; B60W 40/09; B60W 2050/143; B60W 2050/146; B60W 2520/105; B60W 2520/125; B60W 2540/30
USPC ...................................................... 340/439
See application file for complete search history.

(56) References Cited

U.S. PATENT DOCUMENTS

| | | | | |
|---|---|---|---|---|
| 10,066,961 | B2 * | 9/2018 | Korzunov | G01C 21/3697 |
| 2011/0106334 | A1 * | 5/2011 | Filev | B60Q 1/50 |
| | | | | 701/1 |
| 2013/0321627 | A1 * | 12/2013 | Turn, Jr. | B60W 30/00 |
| | | | | 348/148 |
| 2017/0072850 | A1 * | 3/2017 | Curtis | B60W 50/0097 |
| 2017/0232841 | A1 * | 8/2017 | Jensen | F02D 41/10 |
| | | | | 701/110 |
| 2017/0284824 | A1 * | 10/2017 | Korzunov | G01C 21/3697 |
| 2017/0369069 | A1 * | 12/2017 | Yen | B60W 40/09 |
| 2018/0025636 | A1 * | 1/2018 | Boykin | G11B 27/102 |
| | | | | 701/1 |
| 2018/0113461 | A1 * | 4/2018 | Potnis | G05D 1/0088 |
| 2018/0194358 | A1 * | 7/2018 | Gaither | B60W 50/0097 |
| 2018/0204459 | A1 * | 7/2018 | Bradley | G08G 1/164 |

* cited by examiner

*Primary Examiner* — Zhen Y Wu
(74) *Attorney, Agent, or Firm* — Lorenz & Kopf LLP (57) ABSTRACT

Systems and method are provided for issuing a driver alert. In one embodiment, a method includes: receiving, via a processor, driving parameter data representing a current driving parameter for a driving vehicle, receiving, via the processor, threshold data representing driving thresholds for the at least one driving parameter, determining, via the processor, whether to issue a driver alert based on the threshold data and the driving parameter data, thereby producing alert data, and generating and outputting an in-vehicle driver alert based on the alert data.

17 Claims, 3 Drawing Sheets

DRIVER ALERT SYSTEMS AND METHODS

INTRODUCTION

The present disclosure generally relates to vehicles, systems and methods that generate a driver alert, and more particularly relates to vehicles, systems and methods for improving driving skills.

Many vehicles have vehicle motion sensing capabilities for sensing motion parameters such as acceleration, speed, steering angle, and braking (deceleration). Such motion parameters can be representative a driver's driving style. For example, hard braking, high speeds, high turning speeds and high lateral forces can be representative of an aggressive driving style. Some vehicles are capable of sensing their environment using sensing devices such as radar, lidar, image sensors, and the like. More cautious driving styles should be used in certain environments, e.g. icy conditions or dense traffic.

Accordingly, it is desirable to provide vehicles, systems and methods that encourage attentive driving. It is further desirable for vehicles, system and methods to encourage driving in a way that is adaptive to prevailing conditions. Furthermore, other desirable features and characteristics of the present disclosure will become apparent from the subsequent detailed description and the appended claims, taken in conjunction with the accompanying drawings and the foregoing technical field and background.

SUMMARY

Systems and methods are provided for alerting a driver. In one embodiment, a driver alert system includes a processor configured to: receive driving parameter data representing a current driving parameter for a driving vehicle, receive threshold data representing driving thresholds for the driving parameter, determine whether to issue a driver alert based on the threshold data and the driving parameter data, thereby producing alert data, and generate an in-vehicle driver alert based on the alert data.

In embodiments, the driving thresholds are representative of a driving style deemed to be too aggressive (e.g. in terms of turning speed, vehicle speed, braking rate, etc.).

In embodiments, the driving parameter data includes data representing: current driving speed, current braking rate, current turning speed, current longitudinal acceleration and/or current lateral acceleration. Braking rate or deceleration is an indicator of how hard a driver is braking.

In embodiments, the processor is configured to: receive driving context data, calculate risk data representative of current driving risk based on the driving context data, calculate or retrieve adaptive threshold data as the received threshold data based on the risk data, and determine whether to issue a driver alert based on the adaptive threshold data and the driving parameter data, thereby producing the alert data.

In embodiments, the driving context data includes data representative of current driving conditions.

In embodiments, the driving context data includes data representative of: current traffic condition, current weather condition, and type of road currently being traveled.

In embodiments, the processor is configured to receive driver model data and to determine driver feedback data based on the driver model data.

In embodiments, the processor is configured to receive driving context data and to determine the driver feedback data using the driver model data and the driving context data.

In embodiments, the processor is configured to build a driver model based on the current driving parameter data and current driving context data. In some embodiments, the driver model is additionally built based on the threshold data and/or the alert data.

In another embodiment, a method for alerting a driver includes: receiving, via a processor, driving parameter data representing a current driving parameter for a driving vehicle, receiving, via the processor, threshold data representing driving thresholds for the driving parameter, determining, via the processor, whether to issue a driver alert based on the threshold data and the driving parameter data, thereby producing alert data, and generating and outputting an in-vehicle driver alert based on the alert data.

In embodiments, the driving parameter data includes data representing: current driving speed, current braking rate, current turning speed, current longitudinal acceleration and current lateral acceleration.

In embodiments, the method includes receiving, via the processor, driving context data, calculating, via the processor, risk data representative of current driving risk based on the driving context data, calculating or retrieving, via the processor, adaptive threshold data as the received threshold data based on the risk data, and determining, via the processor, whether to issue a driver alert based on the adaptive threshold data and the driving parameter data, thereby producing the alert data.

In embodiments, the driving context data includes data representative of current driving conditions.

In embodiments, the driving context data includes data representative of: current traffic condition, current weather condition, and type of road currently being traveled.

In embodiments, the method includes receiving, via the processor, driver model data and determining, via the processor, driver feedback data based on the driver model data.

In embodiments, the method includes receiving, via the processor, driving context data and determining, via the processor, the driver feedback data using the driver model data and the driving context data.

In embodiments, the processor is configured to build a driver model based on the current driving parameter data and current driving context data.

In another embodiment, a vehicle includes a sensor system for generating driving parameter data representing a current driving parameter for the vehicle, a data storage device storing threshold data representing driving thresholds for the driving parameter, a controller having a processor configured to determine whether to issue a driver alert based on the threshold data and the driving parameter data, thereby producing alert data, and an output device for generating an in-vehicle driver alert based on the alert data.

In embodiments, the output device includes a speaker and/or a display device.

In embodiments, the vehicle includes a vision system configured to generate driving context data, wherein the processor is configured to: calculate risk data representative of current driving risk based on the driving context data, calculate or retrieve adaptive threshold data as the received threshold data based on the risk data, and determine whether to issue a driver alert based on the adaptive threshold data and the driving parameter data, thereby producing the alert data. The risk data is calculated by a separate module from the source of driving context data and a module for determining whether to issue a driver alert. In additional or alternative embodiments, driving context data is available from at least one navigation map (e.g. providing points of interest data) and/or external weather information (e.g. providing weather conditions), amongst other contextual data sources.

In embodiments, the processor is configured to receive driver model data, to determine driver feedback data based on the driver model data and to output driver feedback through the output device based on the driver feedback data.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
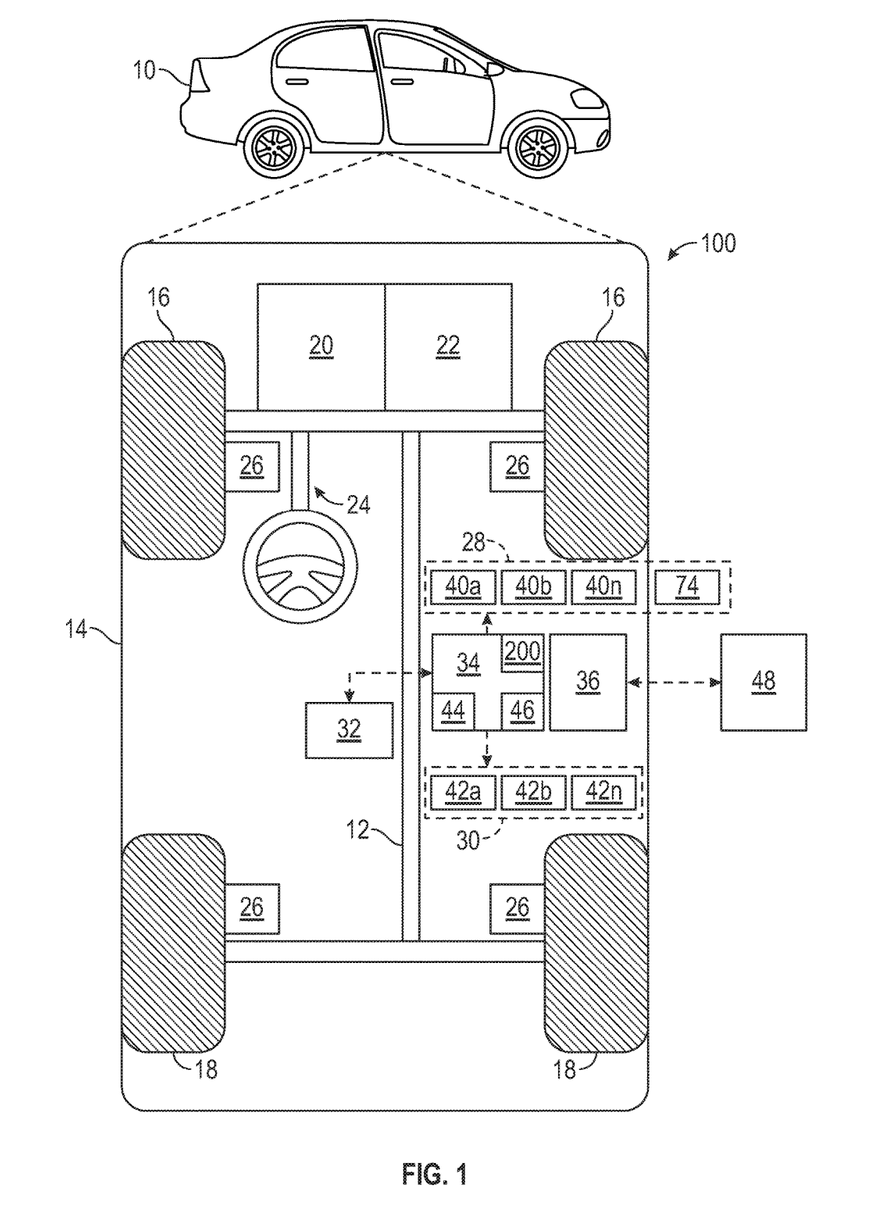
FIG. 1 is a functional block diagram illustrating a vehicle having a driver alert system, in accordance with various embodiments.

With reference to FIG. 1, a driving system shown generally at 100 is associated with a vehicle 10 in accordance with various embodiments. In general, the driving system 100 includes driver alert system 200. The driver alert system 200 is configured to alert a driver in real time when a driving action is performed that is determined to be outside of provided thresholds. Such a system encourages drivers to improve their driving skills by receiving real time alerts regarding driving maneuvers that are outside of provided thresholds.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the driver alert system 200 is incorporated into the vehicle 10. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18 and includes a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, inertial measurement units, and/or other sensors. The sensor system 28 includes an inertial measurement unit for measuring vehicle acceleration including longitudinal and lateral acceleration. Longitude is defined in a direction perpendicular to axles of the vehicle 10. The sensor system 28 includes a vehicle speed sensor (e.g. longitudinal speed) such as a wheel speed sensor. The sensor system 28 includes a wiper sensor for determining when there is precipitation. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

In various embodiments, the sensor system 28 includes a computer vision system 74 that synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The communication system 36 is configured to wirelessly communicate information to and from other entities 48, such as but not limited to, other vehicles ("V2V" communication,) infrastructure ("V2P" communication), remote systems, and/or personal devices. In embodiments, the other entities 48 include a remote system that collects driving data for building a driver model and for generating reports on a driver or a vehicle, as described further below. In embodiments, the other entities 48 include traffic information sources, mapping sources, and weather sources, as detailed herein. In an exemplary embodiment, the communication system 36 is a wireless communication system configured to communicate via a wireless local area network (WLAN) using IEEE 802.11 standards or by using cellular data communication or other communication protocols for V2V, V2I and/or V2P. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for assisting in controlling the components of the vehicle 10, and generate control signals to the actuator system 30 to assist controlling the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to assist in controlling features of the vehicle 10. The control assist features include, in some embodiments, one or more of cruise control, autonomous cruise control, anti-lock braking system, automatic parking, collision avoidance system, emergency driver assistant, intelligent speed adaptation, lane departure warning system, turning assistant, amongst others.

In various embodiments, one or more instructions of the controller 34 are embodied in the driver alert system 200 and, when executed by the processor 44, parse real time driving parameter data and provide in-vehicle alerts to drivers to take correcting actions or to improve their driving skills.

As mentioned briefly above, the driver alert system 200 of FIG. 1 is included within the driving system 100. For example, as shown in more detail with regard to FIG. 2 and with continued reference to FIG. 1, the driver alert system 200 includes an alert determination module 202 configured to receive threshold data 204 and current driving parameter data 206. The alert determination module 202 compares thresholds embodied in the received threshold data 204 with corresponding driving parameters included in the driving parameter data 206 to determine whether one or more thresholds have been breached. The thresholds represent driving limits for a given driving parameter. The driving limits are representative of a driving style deemed to be undesirable or not optimal. The alert determination module 202 outputs alert data 208. On the basis of the alert data 208, an alert generator determines an appropriate driver alert and outputs corresponding alert commands 212. A vehicle output device 214 generates and audible, tactile, haptic or visual driver alert, or any combination thereof, based on the alert commands 212. Such a driver alert system 200 provides, in various embodiments, real-time driver alerts regarding driving actions that are not recommended. In some embodiments, drivers will be able to take real time corrective actions regarding braking, speeding and making turns. Further, drivers are trained, in embodiments, to become more educated and better drivers. Such a system is particularly valuable for learning drivers (e.g. teen drivers) and older drivers (those over the age of 70, for example).

In embodiments, the current driving parameter data 206 includes data representative of one or more of current driving speed, current braking rate, current turning speed, current longitudinal acceleration, steering angle and current lateral acceleration. In one example, driving speed is available from vehicle speed sensor of the sensor system 28. In an example, turning speed is derivable from steering angle measurements through steering sensor of sensor system 28 and from vehicle speed. In an example, current braking rate is available from an acceleration sensor of inertial measurement unit of sensor system 28 or from determining rate of decrease of driving speed. In examples, longitudinal and lateral acceleration are available from acceleration sensors of inertial measurement unit of sensor system 28. Other driving parameters may be embodied in current driving parameter data 206 for use in alert determination module 202. The various sensors of sensor system 28 that provide the current driving parameter data 206 are embodied in vehicle motion sensors 216 in the exemplary embodiment of FIG. 2.

In embodiments, the alert determination module 202 receives threshold data 204, 220. In one example (not illustrated in FIG. 2), the threshold data 220 received by the alert determination module 202 is taken from data storage device 32 and is predetermined. In the illustrated embodiment of FIG. 2, which will be described further below, an adaptive threshold module 218 adapts static threshold data 220 to provide adaptive threshold data 204 used by alert determination module 202. The threshold data 204, 220 defines a threshold value for each of the driving parameters included in the current driving parameter data 206.

Figure 2:
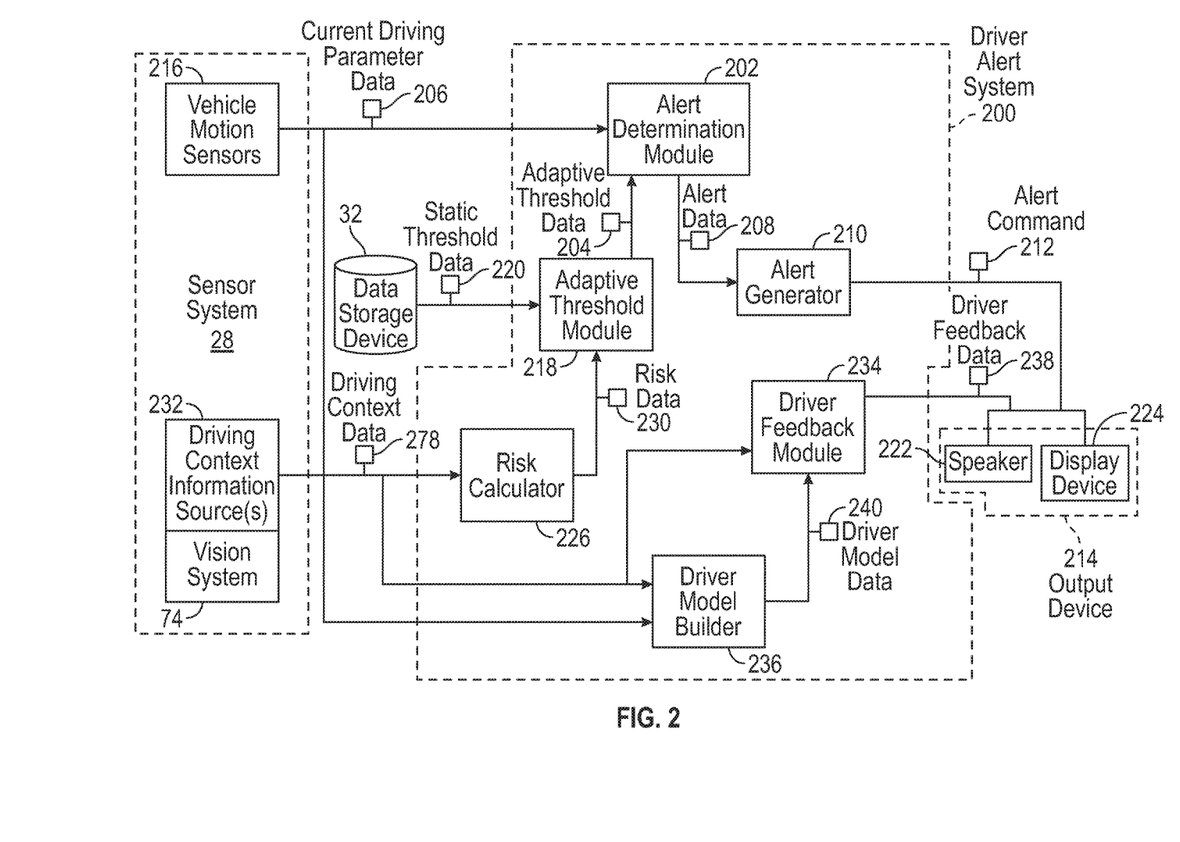
FIG. 2 is a dataflow diagram illustrating a driving system that includes the driver alert system of the vehicle, in accordance with various embodiments.

In various embodiments, the alert determination module 202 is configured to compare driving parameters included in the driving parameter data 206 with corresponding threshold values included in the threshold data 220, 204. Based on the comparison, when thresholds have been breached, the alert determination module 202 determines that a driver alert should be issued and bundles one or more alert types into alert data 208. For example, when driving speed exceeds a threshold value, a high-speed alert is included in alert data 208. In another example, when longitudinal acceleration indicates a speeding-up rate that exceeds a recommended acceleration threshold value, a high-acceleration alert is included in alert data 208. In a further example, when rate of decrease of speed or longitudinal acceleration indicates braking that exceeds a recommended braking threshold value, a hard-braking alert is included in alert data 208. In yet another example, when steering angle and vehicle driving speed or lateral acceleration indicates a turning speed that exceeds a recommended turning threshold value, a high-turning speed alert is included in alert data. In addition to these examples, a number of other current driving parameters indicative of driving style could be included in current driving parameter data 206. Further, additional thresholds associated with current driving parameters could be included in threshold data 204, 220.

In the exemplary embodiment of FIG. 2, the driver alert system 200 includes an alert generator 210 configured to receive the alert data 208 and to determine one or more appropriate alert commands 212. The alert generator 210 is, in some embodiments, configured to map each type of alert included in alert data 208 with an alert command 212. That is, each type of alert (e.g. hard-braking alert or high longitudinal or lateral acceleration alert) is associated with a different alert command (e.g. output hard-braking alert light, output high acceleration sound). Such association between type of alert and alert command may be included in a map stored in storage device 32. In exemplary embodiments, the alert commands include commands for display lights, display screens, speakers, personal mobile devices, etc.

In various embodiments, the driving system 100 includes an output device 214 including a vehicle speaker 222 and a display device 224. The speaker 222 and the display device 224 are mounted in a user interface panel of the vehicle 10, in some embodiments. In other embodiments, the output device 214 includes a personal mobile device (e.g. smartphone) of the driver that is located in the vehicle 10. In another example embodiment, the output device 214 includes a haptic output device configured to output vibration or other tactile responses to the driver. The output device 214 is responsive to the alert commands 212 to output one or more real-time driver alerts. In embodiments, audible driver alerts, delivered through speaker 222, could be used. In additional or alternative embodiments, visual driver alerts, delivered through display device 224, could be used. Exemplary audible driver alerts include tones, beeps and artificial speech replication. Exemplary visual driver alerts includes indicator lights, displayed text, and displayed graphics.

The combination of alert determination module 202 and alert generator 210 as described above provides one example driver alert system 200 according to the present disclosure. In further embodiments, however, and as shown in FIG. 2, a risk calculator 226 and an adaptive threshold module 218 are additionally included so that alert determination module 202 operates on adaptive threshold data 204 that has been adapted depending on driving conditions.

In embodiments, the risk calculator 226 is configured to receive driving context data 228. The driving context data 228 represents conditions in which the vehicle 10 is driving. In examples, the driving context data 228 includes data representative of one or more of current traffic condition, current weather condition, and type of road currently being traveled. In various embodiments, at least part of the driving context data 228 is derived from data output from vision system 74. Vision system 74 is configured to image, using one or more imaging modalities as hereinbefore described), an environment at least partly surrounding the vehicle 10. The vision system 74 is configured to localize and classify objects (including living beings) in image data from one or more imaging sources (e.g. optical cameras, radar and/or lidar scanners, etc.) and to output classified and localized vision system data. Objects such as vehicles, lane and road boundaries, road infrastructure, pedestrians amongst others are able to be localized and classified by the vision system 74, allowing data indicative of traffic, road and/or lane conditions to be embodied in driving context data 228.

Other sources of driving context data 228 are envisaged in exemplary embodiments. Driving context information sources 232 include remote entities 48 providing traffic, weather and/or type of road data. In another example, driving context information sources 232 include a wiper sensor or a temperature sensor of sensor system 28 allowing prevailing weather conditions to be inferred. Prevailing weather is additionally or alternatively derivable by vision system 74, through wiper sensor, through a connection to a cloud source of weather information, through an Internet connection, through some other wireless source of weather information, etc. Type of road information is derivable from remote entity 48 and/or in-vehicle navigation maps stored on storage device 32 or navigation maps stored in remote entity 48 (such as a remote server), in various embodiments. In additional or alternative embodiments, type of road information is derived by vision system 74 Driving context data 228 such as traffic information, construction areas, other hazards, points of interest, school locations, etc. are available from various sources including navigation maps (on-board or wirelessly obtained) and external or on-board weather and/or traffic information sources.

In embodiments, the various sources of driving context data 228 embody traffic information, weather information, type of road information (e.g. wet conditions, number of lanes, classification of roads such as highway, freeway or urban) and other information (such as prevailing lighting conditions) indicative of driving conditions that are determinative of a recommended driving style. Another example of driving conditions having an impact on driving style would be environmental brightness. Nighttime driving is generally more challenging for a human driver than day time driving. Similarly, a bright, sunny day may offer better driving conditions than a duller day. Environmental brightness is determinable through vision system 74 or one or more light sensors included in sensor system 28.

The risk calculator 226 is configured to determine a risk parameter based on the driving context data 228, which risk parameter is embodied in risk data 230 output by the risk calculator 226. The risk calculator 226 is, in some embodiments, configured to use a map from data storage device 32 or from remote entity 48 to map one or more driving context parameters included in driving context data 228 to a risk parameter included in risk data 230. For example, when dense traffic is indicated in driving context data 228 (e.g. as derived from remote traffic information entity 48 and/or vision system 74), risk calculator 226 outputs an indicator of high risk. More challenging driving conditions, which would optimally make use of more conservative driving styles, correlate to higher risk being determined by the risk calculator 226. In another example, when urban roads are indicated in driving context data 228 (e.g. as derived from navigation map and/or from vision system 74), risk calculator 226 outputs an indicator of high risk. In yet another example, when driving adverse weather conditions (rain, snow or ice) are indicated in driving context data 228 (e.g. as derived from remote weather information entity 48, sensor system 28 and/or vision system 74), risk calculator 226 outputs an indicator of high risk. Conversely, when driving context data 228 includes information indicating light traffic, dry weather and highway driving, risk calculator 226 outputs indicator of low risk. Risk included in risk data 230 is indicated in qualitative levels, e.g. at least three levels including low, medium or high risk, in some embodiments, or as a more continuous quantity (e.g. percentage) in other embodiments.

In various embodiments, the risk calculator 226 is configured to receive driving context data 226 embodying data describing a plurality of different types of driving conditions (e.g. weather, traffic, road type) and the risk calculator 226 is configured to take into account each type of driving condition in determining risk data 230. For example, a risk value corresponding to each type of driving condition is determined by risk calculator 226 and risk calculator runs a data fusion process (e.g. averaging, highest, etc.) on the risk values to determine a risk parameter included in risk data 230.

In embodiments, the higher the risk, the more conservative the driving style should be. The adaptive threshold module 218 is configured to determine adaptive threshold data 204 so that less extreme (e.g. smoother) driving maneuvers breach the various thresholds included in the adaptive threshold data 204 when relatively high risk is described by risk data 230. In this way, the driver alert system 200 suggests more conservative, smoother driving for a driver, through driver alerts, as the risk determined by the risk calculator 226 increases. Conversely, more abrupt driving maneuvers are less likely to trigger a driver alert when risk calculator 226 determines upon a lower risk parameter in risk data 230.

In various embodiments, the adaptive threshold module 218 is configured to receive static threshold data 220 stored in data storage device 220 and to adapt the static thresholds in the static threshold data 220 to provide adaptive threshold data 204. In particular, the adaptive threshold module 218 is configured to increase or decrease thresholds included in static threshold data 220 depending upon risk indicated by the risk data 230. For example, percentage change in risk parameter included in the risk data 230 could be applied to thresholds included in static threshold data 220. Alternatively, differing thresholds could be retrieved, via adaptive threshold module 218, from data storage device 32 depending upon risk parameter included in risk data 226. In such an embodiment, the adaptive threshold module 218 does not calculate thresholds based on static threshold data 220 and risk data 230, but retrieves differing static threshold data 220 depending upon risk data 230. In one exemplary embodiment, when risk calculator 226 determines a high risk (e.g. due to dense traffic), low thresholds (e.g. for braking or turning speed) are retrieved or calculated by adaptive threshold module 218 for inclusion in adaptive threshold data 204.

According to the embodiment described including a risk calculator 226 and an adaptive threshold module 218, contextual information is taken into account to provide driver alerts that are adapted to driving context, allowing a driver to learn how to improve driving skills under given driving conditions. For example, if a road is wet, a driver alert for a hard brake might be provided for a threshold smaller than a hard-alert brake for a normal road, since the risk of a wet road is higher.

In another embodiment, a driver feedback module 234 and a driver model builder 236 is included in the driver alert system 200. In such an embodiment, driver feedback data 238 is determined by the driver feedback module based on a driver model included in driver model data 240. Driver feedback included in driver feedback data 238 is output through output device 214. The driver feedback data 238 embodies driver feedback on a driver's style of driving (e.g. regarding braking, speeding, turning, centering in lanes, parking, behavior in different traffic situations, behavior in different weather conditions, behavior on different road types, etc.). Contextualized driving patterns are learned by driver model builder 236 based on driving context data 228 and current driving parameter data 206 and embodied in driver model data 240. Such driver models can be learned on-line or off-line and optionally adjusted as the person drives. The driver feedback module 234 is configured to receive driving context data 228, to retrieve driving patterns relevant to current driving context using driver model data 240 and to determine context relevant driver feedback in the form of driver feedback data 238.

In various embodiments, the driver model builder 236 is configured to receive driving context data 228 and current driving parameter data 206. The driving context data 228 and driving parameter data 206 represent current driving actions during current driving conditions. As such, the driver model builder 236 is able to match driving patterns for a given driver during specific driving conditions. This information allows driver model builder 236 to identify driving patterns, e.g. using a learning algorithm, and embody such patterns in a driver model. For example, average proximity to a forward located vehicle (as determinable through vision system 74) during wet conditions (as determinable through wiper sensor, remote weather entity and/or vision system 74) could be learned. In another example, average speed (as determinable from vehicle wheel sensor) on a given type of road (as determinable through vision system 74 and/or navigation map) and/or in a given traffic density (as determinable through vision system 74 and/or remote traffic information entity) could be learned. In a yet further example, braking rate in different weather conditions could be learned. In a yet further example, average driver turning speed could be learned, which could be contextualized with time of day and/or day of the week. Such driving patterns, and many other examples, which embody driving actions and driving conditions could be included in a driver model by driver model builder 236.

In some embodiments, driver model builder 236 is configured to additionally receive alert data 208 and/or threshold data 220, 204 to allow the driver model builder 236 to identify driving patterns with respect to driving conditions that lead to the driver breaching any of the various thresholds included in threshold data 220, 204.

In embodiments, driver feedback module 234 is configured to determine upon driver feedback, which is to be output through output device 214, based on the driver model data 240. In some embodiments, the driver feedback module 234 outputs audio, visual and/or tactile feedback information that is responsive to data included in driver model. For example, driver model, included in driver model data 240, includes information on average driver turning speed and feedback is provided through output device 214 relaying that slower turning speeds should be used. In embodiments, driver feedback module 234 is configured to receive driving context data 228 so that context relevant driver feedback is included in driver feedback module 234. For example, driver model data 240 indicates that hard braking has been used by the driver during wet conditions and driving context data 228 indicates that there are currently wet conditions. This combination of data allows driver feedback module 234 to determine upon a pre-emptive feedback message (e.g. through artificial speech, displayed text or other indicator) that more gradual braking should be used in wet conditions. Further, when higher risk driving conditions exist (as embodied by driving context data 228), which the driver model data 240 indicates tends to lead to a driving threshold being breached, appropriate feedback is determined upon by the driver feedback module 234 to pre-empt, and aim to avoid, a non-recommended driving action that has previously been taken by the driver in such conditions.

Figure 3:
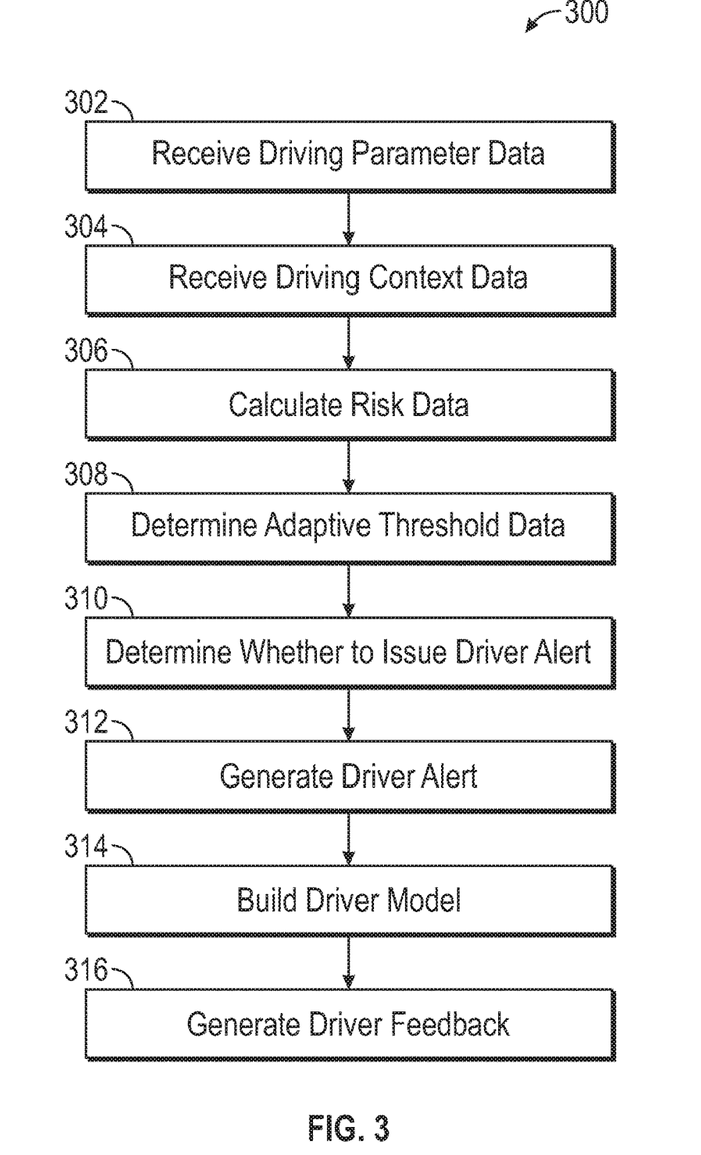
FIG. 3 is a flowchart illustrating a driver alert method, in accordance with various embodiments.

Referring now to FIG. 3, and with continued reference to FIGS. 1 and 2, a flowchart illustrates a driver alert method 300 that can be performed by the driver alert system 200 of FIG. 2 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure. In various embodiments, the method 300 can be scheduled to run based on one or more predetermined events, and/or can run continuously during operation of the vehicle 10.

In step 302, the driver alert method 300 includes receiving current driving parameter data 206 embodying various driving parameters (including braking, turning speed, vehicle speed, longitudinal acceleration and/or lateral acceleration). The current driving parameter data 206 is received from vehicle motion sensors 216 included in sensor system 28 and/or is received from vision system 74.

In step 304, the driver alert method 300 includes receiving driving context data 228. The driving context data 228 describes driving conditions. The driving context data 228 is received from one or more of a variety of sources 232 including vision system 74, remote weather information entity 48, remote traffic information entity 48, navigation map, and other sensors of sensor system 28 (e.g. wiper sensor, temperature sensor, etc.).

In step 306, risk data 230 is calculated, via risk calculator 226, by determining one or more risk parameters based on driving conditions as described by driving context data 228. The one or more risk parameters are embodied in risk data 230.

At step 308, adaptive threshold data 204 is determined, via adaptive threshold module 128. Adaptive threshold module 128 is, in one embodiment, configured to receive static threshold data 220 describing optimal or recommended driving thresholds for various different driving parameters. The adaptive threshold module 128 is configured to proportionally increase or decrease the thresholds depending upon the risk data 230. That is, if risk data described relatively increased risk due to prevailing driving conditions, then the adaptive threshold module 128 calculates adjusted thresholds from the static threshold data 220 that are breached by smoother driving. In another embodiment, the adaptive threshold module 218 is configured to retrieve adaptive threshold data 204 from the storage device 32 in dependence on the risk data 230. The adaptive threshold module 218 is, in some embodiments, configured to turn to different memory locations depending on the risk data 230 so that the thresholds defined in the adaptive threshold data 204 is adapted to the risk defined in the risk data 230.

It should be appreciated that steps 306 and 308 can be omitted in some embodiments. In such embodiments, threshold data 220 is retrieved that is static rather than being adaptive to risk data.

At step 310, a determination is made whether to issue a driver alert, via alert determination module 202. A comparison is made between thresholds included in threshold data 204, 220 and corresponding driving parameters included in current driving parameter data 206. When one or more thresholds are breached, it is determined to issue an alert. In addition to including in alert data 208 that a driver alert should (or should not be) issued, the alert data 208 describes a type of driver alert that should be issued.

At step 312, one or more driver alerts are generated, via alert generator 210 and output device 214. The type of driver alert described in alert data is matched with a corresponding alert command 212 so that output device 214 issues one or more driver alerts relevant to the one or more thresholds that have been breached (e.g. a hard-braking alert when hard braking threshold has been passed and a turning speed alert when a turning speed threshold has been breached). The output device 214 outputs audible, visual and/or tactile messages to a driver of the vehicle 10 through a speaker 222, a haptic device (not shown), a display device 224, etc., which may be built into a user interface panel of the vehicle 10 and/or part of a personal mobile device of the driver.

In some embodiments, the method further includes optional steps 314 and 316. At step 314, a driver model is built, via driver model builder 236. The driver model is built based on received current driving parameters 206, driving context data 228 and optionally also threshold data 220, 204 and/or alert data 208. The driver model describes a learning of driving patterns (based on a history of current driving parameters 206) that are contextualized with driving conditions (based on a history of driving context data 228). In some embodiments, the driving model further includes driving condition contextualized learning of driving patterns when driver alerts are issued and/or when thresholds are breached (based on threshold data 220, 204 and/or alert data 208). The driver model so built is embodied in driver model data 240.

At step 316, driver feedback is generated based on the driver model data 240, via driver feedback module 234 and output device 214. Driver feedback is generated so as to provide a message to the driver relevant to a driving pattern included in driver model data 240. In some embodiments, the driver feedback is selected based on driving context data 228 so that one or more driving conditions included in driving context data 228 is mapped to a driving pattern for those one or more conditions included in driver model data 240. In some embodiments, a non-recommended or suboptimal driving pattern, e.g. a driving pattern that breaches one or more thresholds included in threshold data 220, 204, that is included in the driver model for a currently relevant driving condition is identified and a relevant feedback message is generated and output through output device 214.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A driver alert system, comprising:
   at least one processor configured to:
   receive driving parameter data representing at least one current driving parameter for a driving vehicle, the driving parameter data indicative of current driving conditions that are determinative of a recommended driving style;
   receive threshold data representing driving thresholds for the at least one driving parameter;
   determine whether to issue a driver alert based on the threshold data and the driving parameter data, thereby producing alert data;
   generate at least one in-vehicle driver alert based on the alert data and corresponding to the recommended driving style;
   receive driving context data;
   determine whether the driving context data indicates that high risk driving conditions exist;
   determine whether a non-recommended driving action has previously been taken by a driver in the high risk driving conditions; and
   when the non-recommended driving action has previously been taken, deliver the at least one in-vehicle driving alert to pre-empt the non-recommended driving action.

2. The driver alert system of claim 1, wherein the driving parameter data includes data representing at least one of: current driving speed, current braking rate, current turning speed, current longitudinal acceleration and current lateral acceleration.

3. The driver alert system of claim 1, wherein the at least one processor is configured to: calculate risk data representative of current driving risk based on the driving context data, calculate or retrieve adaptive threshold data as said threshold data based on the risk data, determine whether to issue a driver alert based on the adaptive threshold data and the driving parameter data, thereby producing the alert data; and provide driving suggestions, via the at least one in-vehicle driver alert, to reduce driving the current driving risk when the risk data indicates an increased risk level.

4. The driver alert system of claim 3, wherein the at least one processor includes an adaptive threshold module configured to change the driving thresholds based on a level of risk indicated by the risk data.

5. The driver alert system of claim 3, wherein the driving context data includes data representative of at least one of: current traffic condition, current weather condition, and type of road currently being traveled.

6. The driver alert system of claim 1, wherein the at least one processor is configured to: receive driver model data; retrieve driving patterns relevant to a current driving context using driver model data; and determine a context relevant driver feedback for inclusion in the at least one in-vehicle driver alert.

7. The driver alert system of claim 1, wherein the at least one processor is configured to: build a driver model based on the current driving parameter data and current driving context data, receive the alert data; identify driving patterns with respect to past driving conditions that have lead to a driver breaching the driving thresholds; and deliver the at least one in-vehicle driving alert based on the alert data and the driving patterns.

8. A method for alerting a driver, the method comprising:
   receiving, via at least one processor, driving parameter data representing at least one current driving parameter for a driving vehicle indicative of current driving conditions that are determinative of a recommended driving style;
   receiving, via at least one processor, threshold data representing driving thresholds for the at least one driving parameter;
   determining, via at least one processor, whether to issue a driver alert based on the threshold data and the driving parameter data, thereby producing alert data;
   generating and outputting at least one in-vehicle driver alert based on the alert data and corresponding to the recommended driving style;
   receiving, via at least one processor, driver model data;
   receiving, via at least one processor, driving context data;
   determining, via at least one processor, driver feedback data using the driver model data and the driving context data;
   determining, via at least one processor, whether the driving context data indicates that high risk driving conditions exist;
   determining, via at least one processor, whether a non-recommended driving action has previously been taken by a driver in the high risk driving conditions;
   when the non-recommended driving action has previously been taken, delivering, via at least one processor, the at least one in-vehicle driving alert to pre-empt the non-recommended driving action;
   retrieving, via at least one processor and using driver model data, driving patterns relevant to current driving context; and
   determining, via at least one processor, context relevant driver feedback for outputting with the at least one in-vehicle driver alert.

9. The method of claim 8, wherein the driving parameter data includes data representing at least one of: current driving speed, current braking rate, current turning speed, current longitudinal acceleration and current lateral acceleration.

10. The method of claim 8, comprising calculating, via at least one processor, risk data representative of current driving risk based on the driving context data, calculating or retrieving, via at least one processor, adaptive threshold data as said threshold data based on the risk data, determining, via at least one processor, whether to issue a driver alert based on the adaptive threshold data and the driving parameter data, thereby producing the alert data, and providing, via at least one processor and through the driver alert, driving suggestions to reduce the current driving risk when the risk data indicates a risk level that is increased.

11. The method of claim 10, comprising changing, by an adaptive threshold module in at least one processor, the driving thresholds based on the risk level indicated by the risk data.

12. The method of claim 10, wherein the driving context data includes data representative of at least one of: current traffic condition, current weather condition, and type of road currently being traveled.

13. The method of claim 8 comprising building, via at least one processor, a driver model based on the current driving parameter data and current driving context data, receiving, by at least one processor, the alert data; identifying, via at least one processor, driving patterns with respect to past driving conditions that have lead to a driver breaching the driving thresholds, and delivering, via at least one processor, the at least one in-vehicle driving alert based on the alert data and the driving patterns.

14. A vehicle, comprising:
- a sensor system for generating driving parameter data representing at least one current driving parameter for the vehicle;
- at least one data storage device storing threshold data representing driving thresholds for the at least one driving parameter;
- a controller having at least one processor configured to:
  - determine whether to issue a driver alert based on the threshold data and the driving parameter data, thereby producing alert data;
  - change, via an adaptive threshold module, the driving thresholds based on a level of risk indicated by risk data;
  - receive driving context data;
  - determine the driver feedback data using the driver model data and the driving context data;
  - determine whether the driving context data indicates that high risk driving conditions exist;
  - determine whether a non-recommended driving action has previously been taken by a driver in the high risk driving conditions; and when the non-recommended driving action has previously been taken, deliver at least one in-vehicle driving alert to pre-empt the non-recommended driving action; and
- at least one output device for generating at least one in-vehicle driver alert based on the alert data.

15. The vehicle of claim 14, wherein the output device comprises at least one of a speaker and a display device.

16. The vehicle of claim 14, comprising a vision system configured to provide the driving context data, wherein the at least one processor is configured to: calculate risk data representative of current driving risk based on the driving context data, calculate or retrieve adaptive threshold data as said threshold data based on the risk data, and determine whether to issue a driver alert based on the adaptive threshold data and the driving parameter data, thereby producing the alert data.

17. The vehicle of claim 14, wherein the at least one processor is configured to: receive driver model data, to determine driver feedback data based on the driver model data, and to output driver feedback through the output device based on the driver feedback data.

* * * * *